United States Patent [19]
Smith et al.

[11] Patent Number: 4,911,209
[45] Date of Patent: Mar. 27, 1990

[54] METHOD AND APPARATUS FOR FORMING WIRE MESH CAGES

[75] Inventors: Richard V. Smith, Pinehurst, N.C.; Arthur M. Shannon, Scituate, Mass.

[73] Assignee: Expo Wire Company, Mount Airy, N.C.

[21] Appl. No.: 323,937

[22] Filed: Mar. 15, 1989

[51] Int. Cl.⁴ .............................................. B21F 27/20
[52] U.S. Cl. .................................. 140/112; 140/107; 219/56
[58] Field of Search ...................... 140/92.2, 107, 112; 219/56, 58

[56] References Cited

U.S. PATENT DOCUMENTS

| | | |
|---|---|---|
| 1,664,629 | 4/1928 | Kielberg . |
| 3,370,150 | 2/1968 | Nordgren . |
| 3,590,622 | 7/1971 | Elge et al. . |
| 3,678,971 | 7/1972 | Nordgren . |
| 3,752,949 | 5/1972 | Nordgren . |
| 3,780,253 | 2/1973 | Senn . |
| 3,802,239 | 6/1972 | Karmann et al. . |
| 3,879,994 | 8/1973 | Hume . |
| 3,939,879 | 1/1975 | Tolliver et al. . |
| 4,160,146 | 7/1977 | Mundel et al. . |
| 4,428,215 | 9/1981 | Hume . |
| 4,513,596 | 4/1985 | Usher . |
| 4,628,721 | 7/1985 | Williamson . |
| 4,667,707 | 5/1987 | DeSchutter et al. . |
| 4,706,488 | 11/1987 | Williamson . |

Primary Examiner—Lowell A. Larson
Attorney, Agent, or Firm—Nies, Webner, Kurz & Bergert

[57] ABSTRACT

A method and apparatus for automatically forming and welding wire mesh cages useful in reinforcing standard concrete pipe. Prefabricated wire mesh is fed from a coil through a straightener and shear section onto a mandrel. A predetermined length of the wire mesh is sheared and then rolled in cage form on the mandrel and, once rolled, is welded to retain the mandrel shape. The entire operation is automatically controlled by an integrated electrical control and logic system and is run by a single operator. The welding system employs a plurality of small TIG welders which are operated in sequence to reduce power supply demands and which can weld wire in any condition even rusted wire.

35 Claims, 7 Drawing Sheets

METHOD AND APPARATUS FOR FORMING WIRE MESH CAGES

BACKGROUND OF THE INVENTION

This invention relates generally to a system for forming and welding a wire cage useful in reinforcing standard concrete pipe, and more specifically to a method and apparatus for automatically forming and welding wire cages from prefabricated wire mesh at high production rates with welds that are consistent and of high quality even though the wire mesh may be somewhat rusted.

In manufacturing standard concrete pipe it is standard practice to reinforce the concrete pipe by molding the concrete around a preformed wire mesh cage. Most commonly, the cages are formed manually by cutting a length of mesh from a prefabricated wire mesh coil and then welding opposite ends of the cut length through the use of a hand operated electric arc resistance welder. In addition to being very slow, forming and welding the cages by hand fails to produce cages of uniform size and quality, particularly when the prefabricated wire mesh is somewhat rusty and dirty as it often is from sitting around at the manufacturing plant. The rust and dirt often interferes with the arc resistance welding process and causes difficulty in securing high quality welds as required by standard ASTM specifications. Consequently either the welds ultimately provided are inferior or a great deal of time is required to scrape and clean the wires before welding.

In the past, systems have been proposed to form and weld wire cages as illustrated by the apparatus disclosed in prior U.S. Pat. Nos. 3,370,150, 3,678,971, 3,939,879 and 4,160,146. None of the systems however have been widely accepted within the industry either because of cost, unsatisfactory performance, complicated construction and/or maintenance, and particularly because of their inability to work with wire mesh which may be contaminated with rust or dirt. All of the systems disclosed by those prior patents utilize the electric arc resistance welding method which is directly adversely affected by the presence of rust on the mesh being welded. Consequently for the most part the hand forming and welding operation remains the predominant method within the industry.

SUMMARY OF THE INVENTION

Accordingly the primary object of this invention resides in the provision of novel method and apparatus for automatically roll forming and welding wire cages from prefabricated wire mesh at high production speeds.

Another object of this invention resides in the provision of the above novel method and apparatus capable of welding cages from prefabricated wire mesh which might be somewhat contaminated with rust or dirt.

Still another object of this invention resides in the provision of the above novel method and apparatus wherein the cages formed are of uniform size and the welds are of consistent high quality in full satisfaction of ASTM standards.

Still another object of this invention resides in the provision of the above novel method and apparatus wherein a gas tungsen-arc welding system (TIG welding) is employed to produce consistent superior welds even when dealing with somewhat rusted mesh material.

Another object of the invention resides in the provision of the above novel method and apparatus wherein the wire mesh is wound around a novel rotatable mandrel and welded in place on the mandrel by way of a plurality of small TIG welding units spaced across the mandrel in operative alignment with opposite ends of the prefabricated mesh as it is formed and retained on the mandrel.

Still another object of this invention resides in the provision of the above novel method and apparatus which are automatically controlled by an integrated electrical and logic system to manufacture cages at high rates of speed.

A further object of the invention resides in the provision of the above novel method and apparatus wherein the control logic system feeds power to the individual TIG welding units sequentially so as to reduce the power service requirements at the plant for operating the apparatus.

Another object of the invention resides in the provision of the above novel method and apparatus having substantially low power service requirements which are readily satisfied by the electrical service normally available at most pipe manufacturing plants.

Other objects of the invention will become apparent from the following detailed description of the invention with reference to the accompanying drawings.

DETAILED DESCRIPTION OF THE INVENTION

Figures 1, 12:
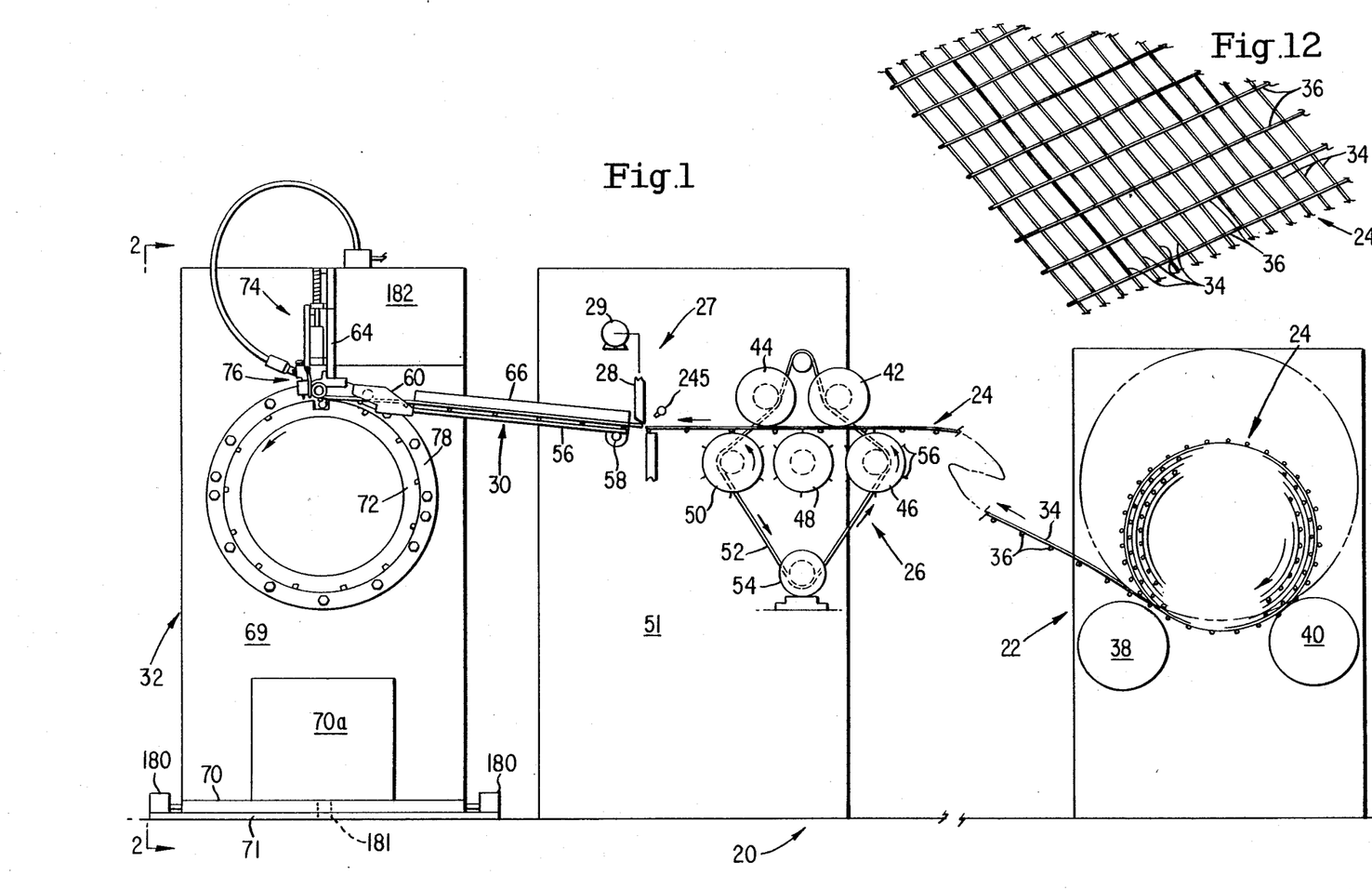
FIG. 1 is a side elevational view of the overall cage forming and welding apparatus of the invention.
FIG. 12 is a fragmentary perspective view of the wire mesh from which the wire cage is formed.

As shown in FIG. 1, the cage forming apparatus 20 of the invention comprises a holding station 22 for supporting a roll or coil of steel wire mesh 24, a feeding and straightening station 26, a shear station 27, a transfer station 30, and a final rolling and welding station 32 at which cylindrical cages ninety-eight inches long and of a selected diameter are produced. The entire operation is controlled automatically by a logic and control system shown schematically in FIG. 14.

As shown in FIG. 12, mesh 24 is conventionally formed to standard ASTM specifications by welding a plurality of endless longitudinal wires 34 spaced about three inches apart to a plurality of transverse wires 36 spaced about six inches apart, each wire 36 being ninety six inches long. Wires 34 and 36 are of conventional diameter, e.g. 0.178 inches in diameter. Mesh 24 is cut off and wound into a coil about thirty-six inches in diameter and a width W of ninety-six inches so that wires 36 are below wires 34 as the coil is unwound by clockwise rotation off the rotatable support rollers 38 and 40 at station 22.

Initially mesh 24 is fed by hand into station 26 between upper rollers 42 and 44 and lower rollers 46, 48, and 50, all of which are mounted on a frame 51 and extend across the full width of mesh 24. Rollers 42, 44, 46, and 50 are driven through chain 52 by an Allen-Bradley servomotor 54. Lower rollers 46, 48 and 50 are provided with a plurality of sprockets spaced across their width, the sprockets having teeth 56 which engage against wires 36 to positively drive mesh 24 forward toward the left in FIG. 1. Mesh 24 is flattened and straightened as it passes through the upper and lower rollers.

The mesh is fed to shear station 27 where a clean cut is initially made by shear blade 28 powered by motor 29 to establish a zero reference point for the start of the automatic forming operation.

Station 30 includes a transfer table 56 having one end pivotally connected at 58 to frame 51, and its other end fixed to a guide head 60 which is connected at its ends via brackets 62 (FIG. 3) to the main welding head mounting plate 64 at station 32. Table 56 has an upright guide rail 66 along one side for guiding mesh 24 into station 32. Head 60 includes a transverse guide roller 68 extending across table 56 and spaced thereabove a distance slightly greater than the combined thickness of wires 34 and 36.

The rolling and welding station 32 includes frame 69 having a base plate 70 and a horizontal stabilizing leg 70a mounted on a main subplate 71, a cylindrical forming mandrel 72 rotatably mounted on frame 69 for rolling mesh 24 into a cylindrical cage, and a welding head assembly 74 including a plurality of individual welding units 76 positioned adjacent mandrel 72 for welding opposite adjacent ends 34a and 34b of wires 34 (FIG. 13) after the cage is rolled on the mandrel.

Mandrel 72 is formed from a piece of cylindrical metal tubing having an outer diameter corresponding approximately to the desired diameter of the finished wire cage, within the range from twelve to twenty-four inches, and a length sufficient to roll the ninety-six inch wide mesh 24. An enlarged flange 78 is welded on the inner end of mandrel 72 and bolts onto face plate 80 welded on hollow arbor 82 which is rotatably mounted via bearings 84 and 86 within cylindrical housing 88 fixed on frame 69. The outer end of arbor 82 is suitably fixed to pulley 90 which is driven via belt 92, pulley 94, and gear reducer 96 from an Allen-Bradley servomotor 98 mounted on frame 69.

Mandrel 72 has a plurality of grooves 100 extending along its length and circumferentially equally spaced a distance corresponding to the spacing between wires 36. Grooves 100 are of a width and depth such that wires 36 are totally nested within the grooves as mesh 24 is wrapped around mandrel 72.

Figure 7:
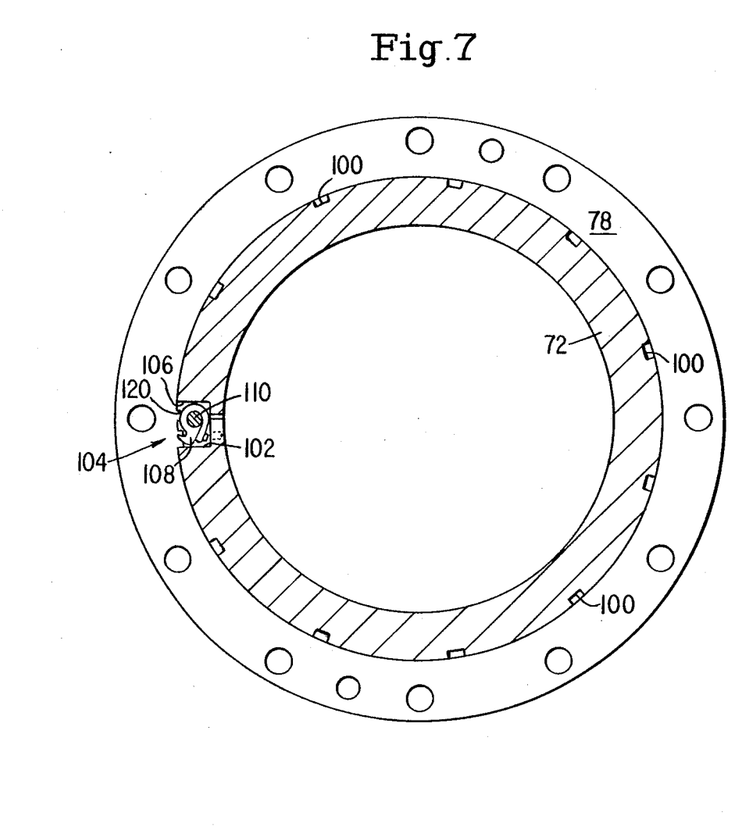
FIG. 7 is a fragmentary view taken along line 7—7 of FIG. 6.
Figure 8:
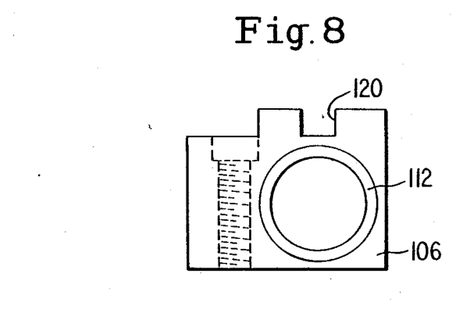
FIG. 8 is a side view taken generally along line 8—8 of FIG. 6, illustrating a wire nesting block.
Figure 9:
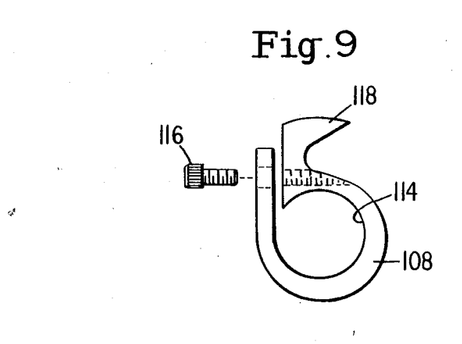
FIG. 9 is a side view taken generally along line 9—9 of FIG. 6, illustrating a dog clamp.

An enlarged slot 102 extends along the length of mandrel 72 in place of one of the grooves 100. A clamp or hold down assembly 104 is mounted within slot 102 and includes a plurality of spaced nesting blocks 106 (FIG. 6, 7 and 8) bolted within slot 102 and a plurality of hold down clamps 108 (FIGS. 6, 7 and 9) positioned between blocks 106. An enlongated shaft 110 extends through aligned bearing bushings 112 mounted within blocks 106 and openings 114 in clamps 108, the clamps being fixed on shaft 110 by tightening cap screws 116. As shaft 110 is turned within bushings 112, the dog fingers 118 of clamps 108 overlie and clamp the lead wire 36 of mesh 24 within aligned grooves 120 in blocks 106, as shown in phantom in FIG. 3. Aligned grooves 120 are equally circumferentially spaced between adjacent grooves 100 so as to correspond to the spacing between wires 34.

Figures 4, 5, 6:
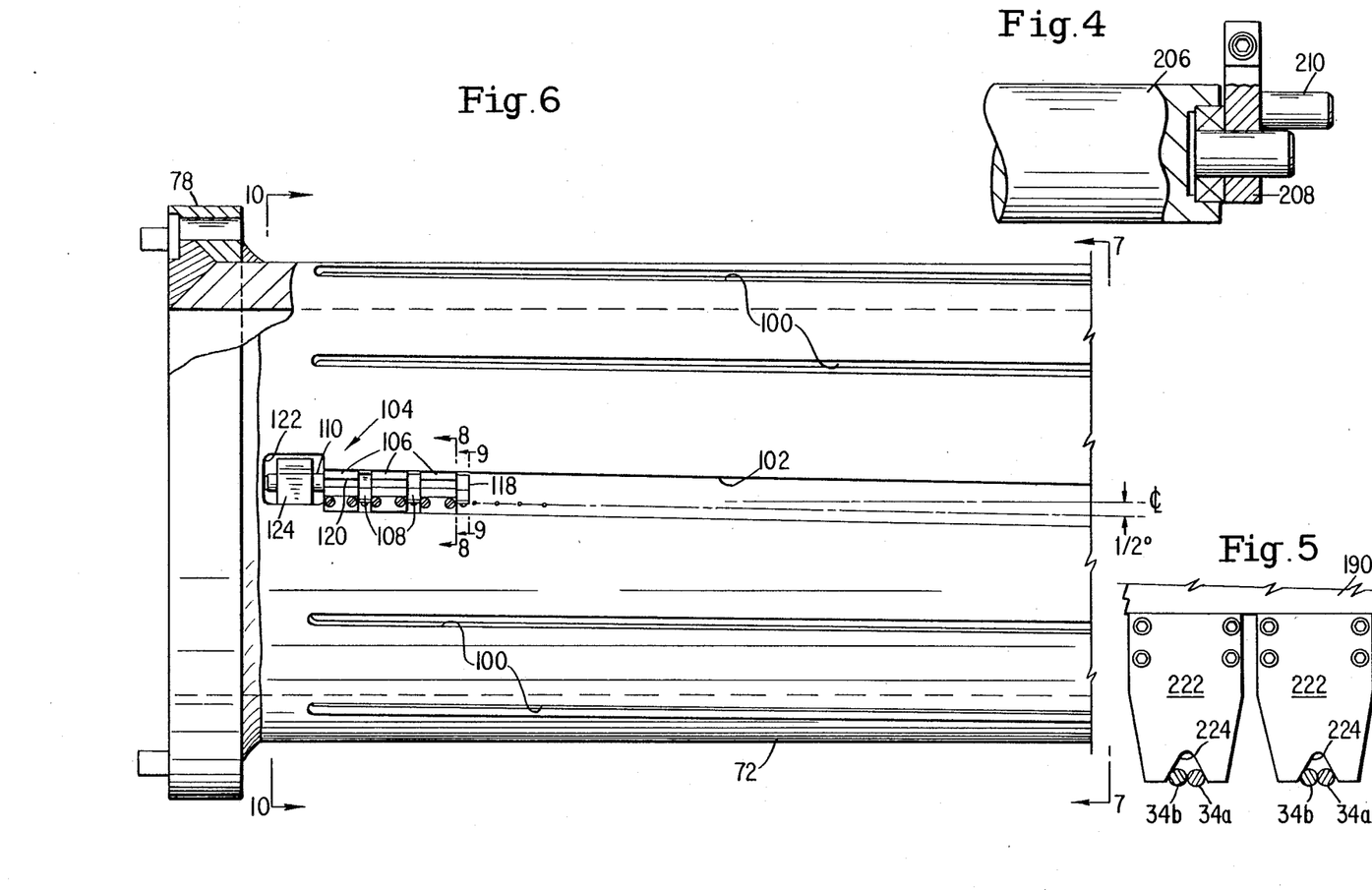
FIG. 4 is a fragmentary sectional view taken generally along line 4—4 of FIG. 3 illustrating the mounting for the force roller.
FIG. 5 is a fragmentary sectional view taken generally along line 5—5 of FIG. 3, illustrating the clamp plate attached to each welding gun holder.
FIG. 6 is an enlarged fragmentary view of the roll mandrel, illustrating several wire nesting blocks and dog clamps mounted in place.
Figure 10:
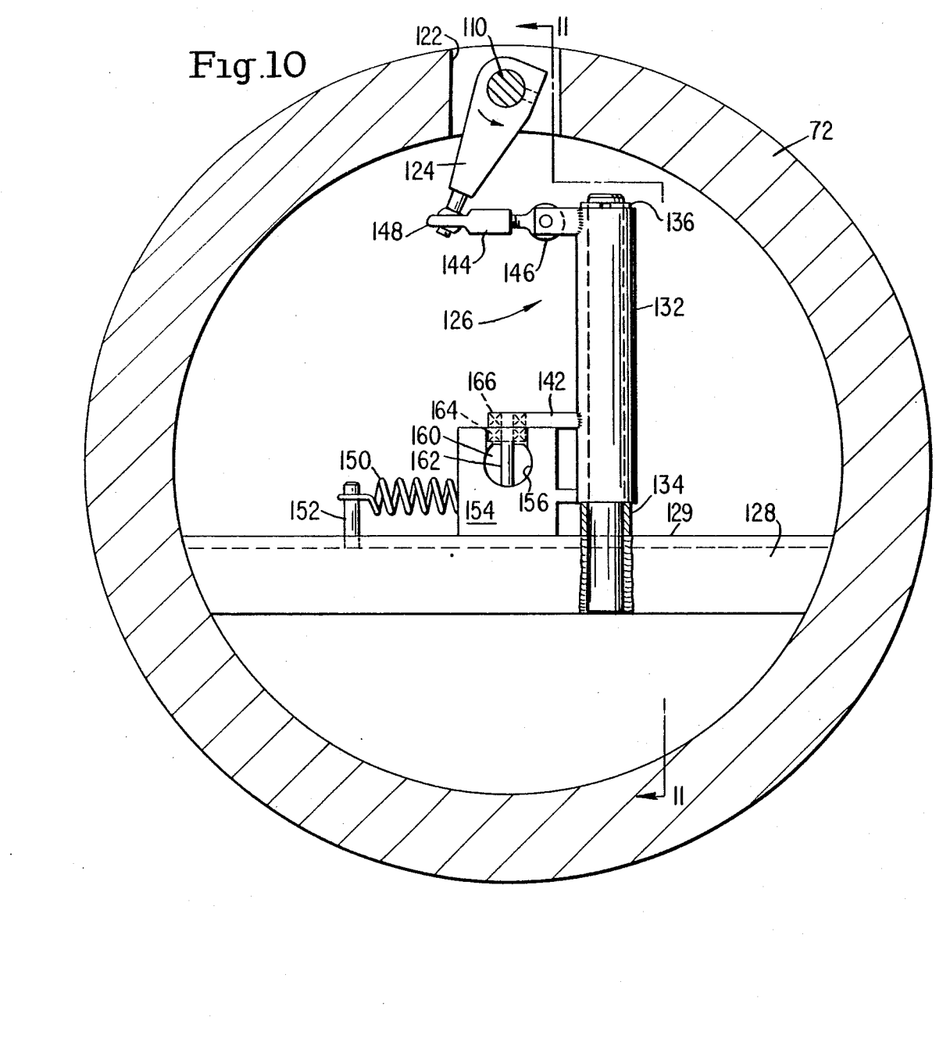
FIG. 10 is a fragmentary sectional view taken generally along line 10—10 of FIG. 6, illustrating the actuating mechanism for the dog clamps.
Figure 11:
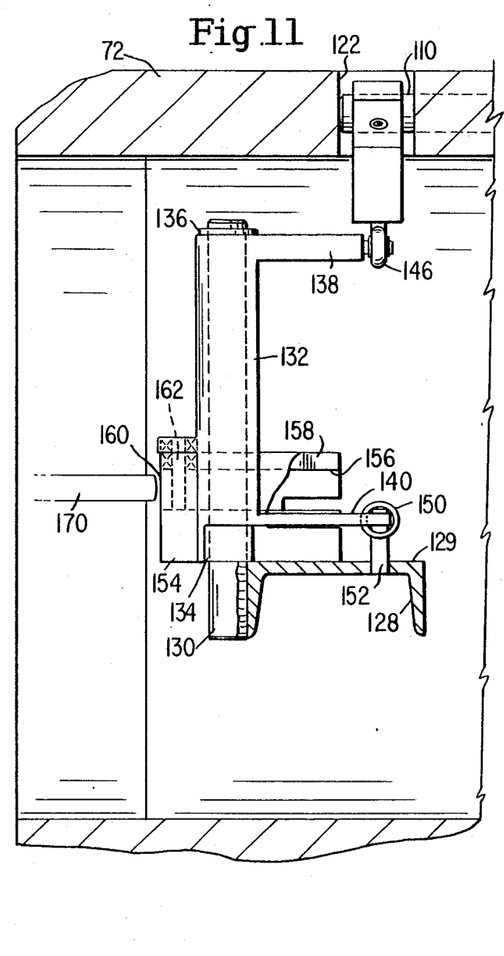
FIG. 11 is a fragmentary view taken along line 11—11 of FIG. 10.

As shown in FIGS. 6, 10 and 11, the inner end of shaft 110 extends beyond slot 102 into an opening 122 in the wall of mandrel 72, and a hold-down crank 124 is fixed at one end on shaft 110 and extends downwardly inside mandrel 72. An operating mechanism 126 for crank 124 is mounted within mandrel 72 and includes a channel member 128 welded within the mandrel and forming a transverse shelf 129, a pivot post 130 welded to member 128 and extending perpendicularly from shelf 129, a roller crank 132 rotatably mounted on post 130 between a washer 134 and snap ring 136. Crank 132 has parallel upper and lower arms 138 and 140 and an intermediate arm 142 at ninety degrees to arms 138 and 140. A connecting rod 144 is connected at one end 146 to arm 138 and at its other end via a universal joint 148 to crank 124. Arm 140 is connected to one end of a return spring 150, the other end of which is connected to a pin 152 fixed on shelf 129.

A slider block 154 is fixed on shelf 129 and has a bore 156 and intersecting slot 158 within which a slider element 160 slides back and forth. A dowel pin 162 is fixed on one end of slider 160 and mounts a first roller bearing 164 which slides back and forth in slot 158, and a second roller bearing 166 which is mounted in an end slot in arm 142.

Slider 160 is actuated inwardly from left to right in FIG. 11 by the rod 170 of an air cylinder 172 (FIG. 2) mounted within arbor 82 and connected via line 174 and rotary coupling 176 to an air supply line 178. As slider 160 is moved inwardly by rod 170 upon energization of cylinder 172, crank 132 is suitably turned to rotate crank 124 and shaft 110 counterclockwise as viewed in FIG. 10 to thereby move clamps 108 and dog fingers 118 to their clamping position shown in phantom in FIG. 3. Spring 150 is stretched. When cylinder 172 is deenergized and rod 170 retracted, spring 150 returns crank 132, slider 160, crank 124, and shaft 110 to their retracted positions, thereby returning clamps 108 to their release positions.

It should be noted that grooves 100 and slot 102 are cut along the mandrel at a slight angle, e.g. ½° as shown in FIG. 6, relative to the center line (C/L) of the mandrel. During set up and operation of the system, mandrel 72 and its center line are slightly cocked, e.g. by ½°, relative to the path of travel of web 24 by properly setting adjusting screw assemblies 180 which are mounted on plate 71, with screw assemblies 180 pivoting frame 69 about pin 181 to set the angle. This causes web 24 to be slightly wound as a helix on the mandrel so that opposite ends 34a and 34b of wires 34 lie side-by-side with each other for welding (FIG. 13) rather than abutting or overlying each other.

A box-type rail 182 extends horizontally from frame 69 above mandrel 72 and mounts the welding head assembly 74 in position relative to the mandrel. As shown best in FIGS. 1–3, the rear mounting plate 64 has a plurality of vertical slots 184 through which a plurality of bolts 186 extend and bolt the plate against mounting pads 188 welded on rail 182. Because of slots 184, plate 64 is adjustable vertically on rail 182 to accommodate mandrels of different diameters.

Welding assembly 74 includes a front plate 190 which is vertically adjustably mounted on plate 64 via a plurality of guide rods 192 fixed on the front of plate 64 and guide bushings 193 fixed on the rear of plate 190 and slidable up and down on rods 192. Plate 190 is adjusted vertically via a plurality of ball screw and nut assemblies including a plurality of nuts 194 fixed on the back of plate 190 and a plurality of screws 196 connected to and driven by a plurality of gear boxes 198 mounted on rail 182, all of which are driven by a reversible motor 200. Plate 190 includes a plurality of vertical slots 202 which align in front of slots 184 to provide access to bolts 186 with a wrench when necessary to adjust plate 64.

A bending force roller assembly 204 extends across the length of mandrel 72 and includes a plurality of rollers 206 suitably rotatably mounted via brackets 208 on the bottom of plate 64. The end brackets 208 have a laterally extending roller pin 210 (FIGS. 3 and 4) which fits within a slot 212 of brackets 62 to support guide head 60 and table 56, and automatically adjust them vertically along with plate 64.

Figure 3:
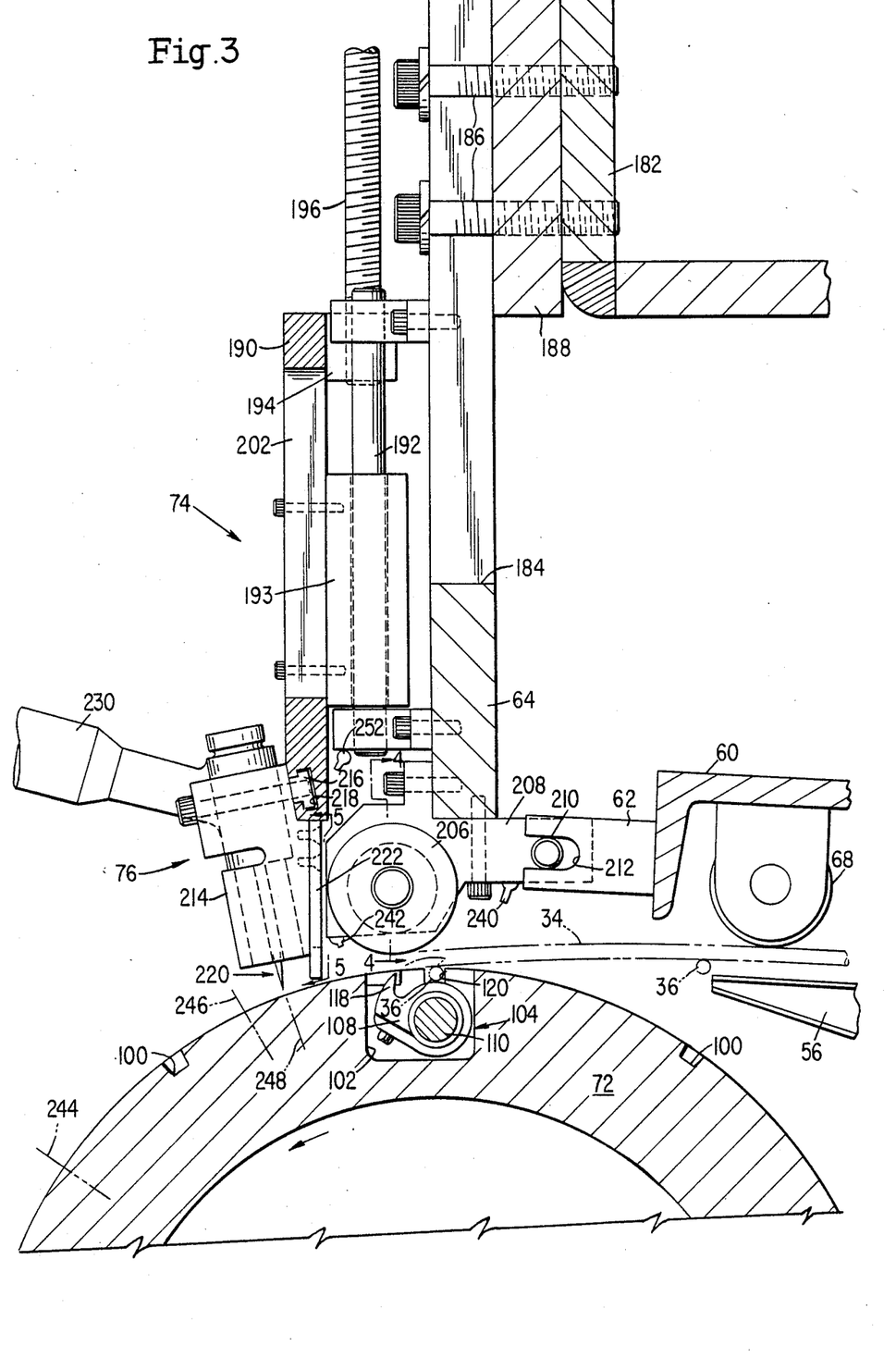
FIG. 3 is a fragmentary side elevation view taken generally along line 3—3 of FIG. 2 illustrating the mounting assembly for positioning the welding guns and bending force rollers with respect to the roll mandrel, the welding guns being shown in their lowered welding position.

As seen best in FIG. 3, force rollers 206 are offset slightly ahead of the center line of mandrel 72 in the direction of rotation of the mandrel so that the rollers impart a bending force, e.g. of about seventy pounds, on mesh 24 as it is rolled around the mandrel.

Figure 2:
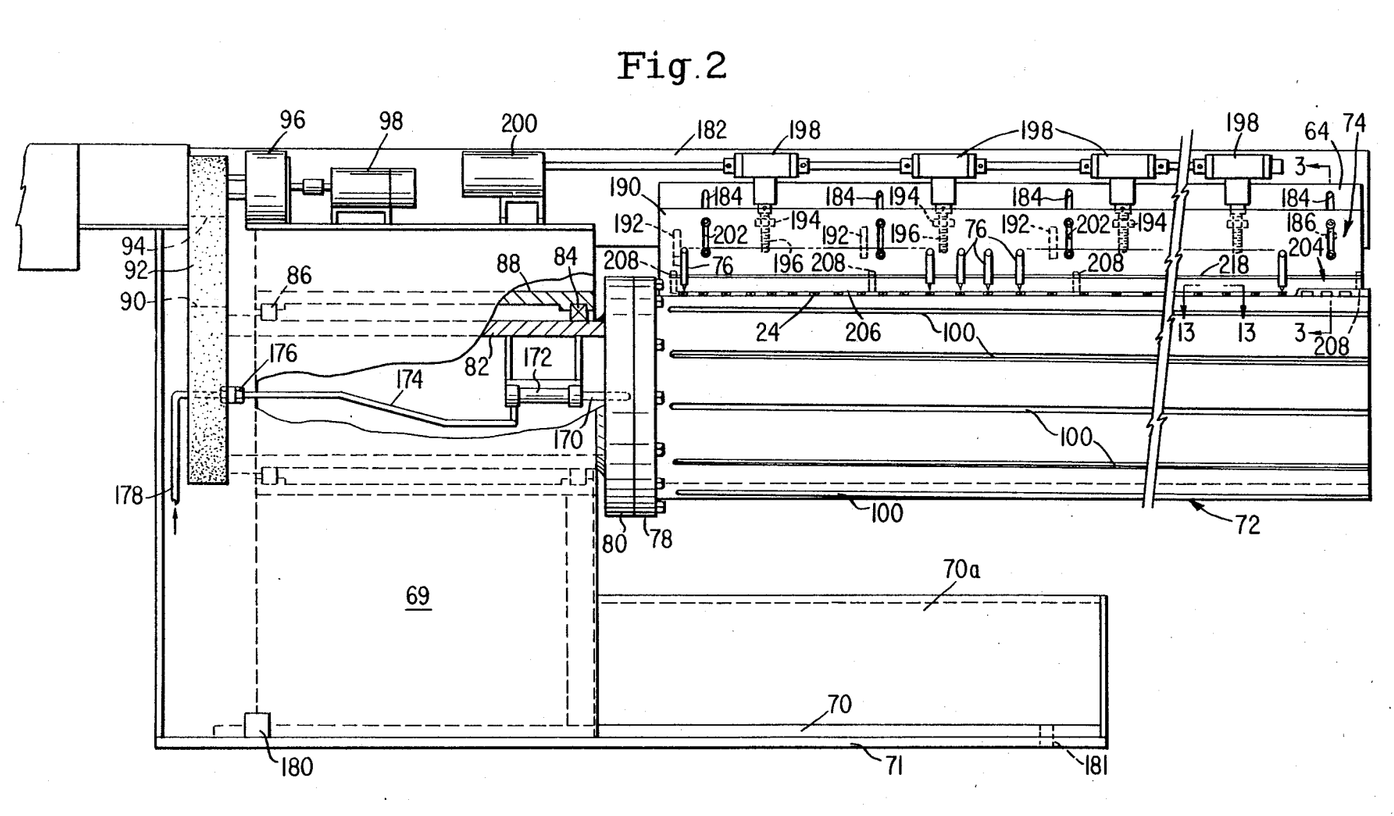
FIG. 2 is an end elevation view taken along line 2—2 of FIG. 1 illustrating the cage rolling and welding station of the invention.

As shown in FIGS. 1–3, a plurality of individual welding units or guns 76, e.g. thirty three in number, are supported in individual holders 214 which are laterally adjustably mounted via T-nuts 216 in a T-slot 218 extending across the front face of plate 190 adjacent its bottom. Welding guns 76 are preferably of the gas tungsten-arc welding (TIG welding) type using argon gas and may, for example, be small units manufactured by Standard Welders, Model No. SW-18. The use of TIG welding units is particularly advantageous, since the nonconsumable tungsten electrode, which is usual fashion does not contact the workpiece that in this case, are ends 34a and 34b of wires 34, produces an intense heat zone 220 to establish a weld puddle between ends 34a and 34b and produce welds 250, even though the wires may be rusted.

Fixed on the back of each holder 214 is a cam plate 222 (FIGS. 3 and 5) having a bottom-opening V-notch 224 which positions and clamps together opposite ends 34a and 34b of wires 34 during the welding process.

Figure 14:
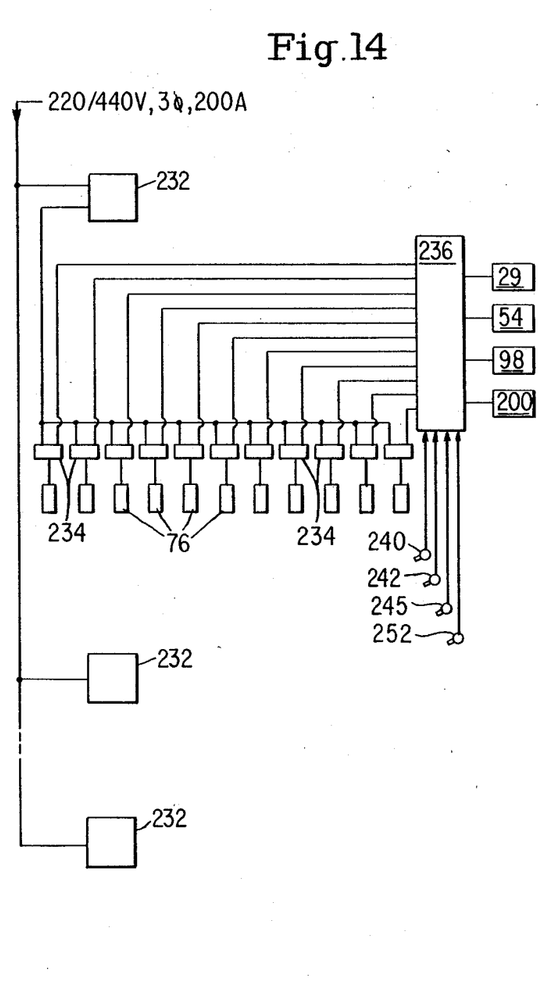
FIG. 14 schematically illustrates a logic and control system for automatically controlling the method and apparatus of the invention.

As shown in FIG. 14, TIG guns 76 are powered by electrical cables within conduit 230 from a power source including three separate generators 232 such as Miller Electric Model No. SR-150, which can be run on a 220/440 volt, 3 phase, 200 amp service. A group of eleven guns 76 are powered by each generator 232 via a respective contactor 234, the contactors being closed in sequence by an Allen-Bradley PC-2 microprocessor 236 to sequentially energize guns 76 for one and one-half second intervals. The microprocessor also sequentially controls individual gas valves (not shown) feeding argon gas to guns 76, and activates each of those valves slightly ahead of its corresponding contactor 234 to provide a gas purge for each gun before it is powered electrically.

The method and apparatus of the invention will be better understood from the following description of a typical cage forming and welding operation. A coil of wire mesh 24 is placed on rollers 38 and 40 and unwound in clockwise fashion as shown in FIG. 1. Initially this mesh is fed by hand between rollers 42 and 46. Motor 54 is then indexed by microprocessor 236 to feed the mesh through station 26 where it is straightened and flattened to position the leading edge of the mesh under shear blade 28. Motor 29 is then energized so that shear blade 28 takes an initial clean up cut across the mesh to establish a zero reference point.

The system is now ready for an automatic cage forming and welding operation under control of the program within microprocessor 236. Mandrel 72 is positioned as shown in FIGS. 1 and 3 with slot 102 in the twelve o'clock position and with plate 190, guns 76, and cam plates 222 in a raised non-welding position above the mandrel. Motor 54 is first energized to feed mesh 24 across table 56 underneath guide roller 68, which directs the leading transverse wire 36 into aligned grooves 120 of blocks 106 (FIGS. 1 and 3). Lateral positioning of mesh 24 is maintained by guide rail 66.

Figure 13:
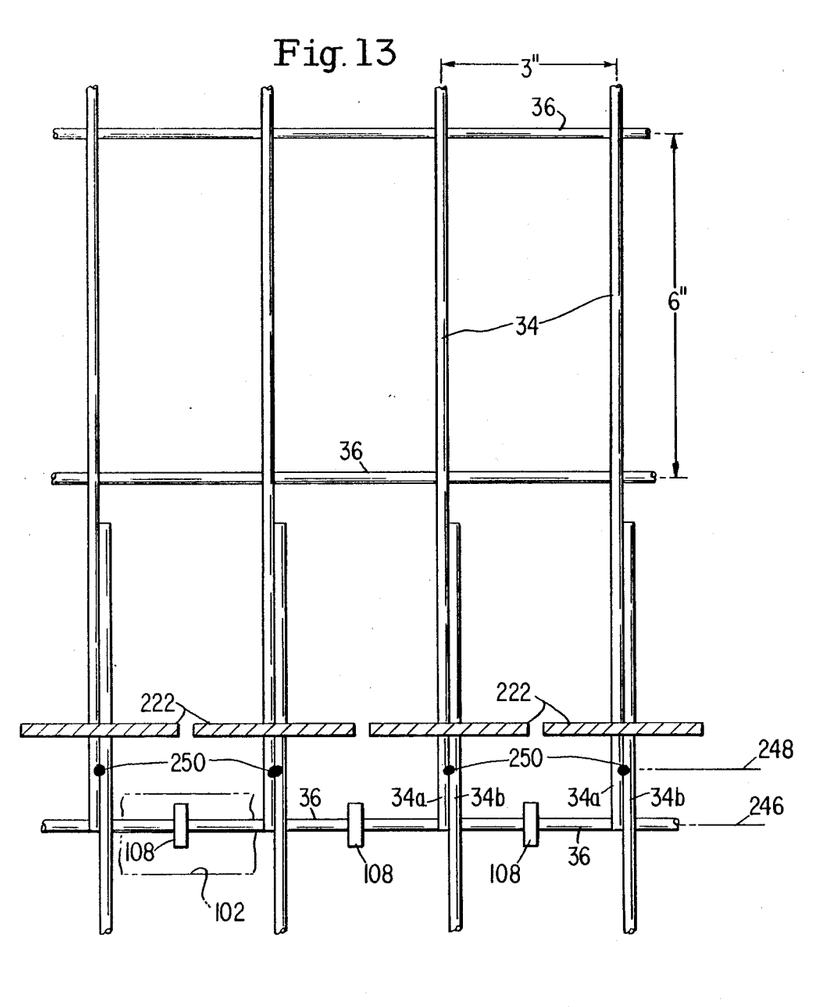
FIG. 13 is a fragmentary view taken generally along line 13—13 of FIG. 2 illustrating the weld position of the wires on the mandrel.

An optical sensor device 240 feeds a signal to microprocessor 236 indicative of the presence of lead wire 36 in grooves 120, the microprocessor then deenergizing motor 54 and actuating the air supply through line 178 to air cylinder 172 to rotate and close clamps 108 and dog fingers 118 to their phantom position shown in FIG. 3 in which they clamp wire 36 in grooves 120. A second optical sensor 242 signals the microprocessor that clamps 108 are closed, the microprocessor then energizing both motors 54 and 98 in timed relation to simultaneously feed mesh 24 and rotate mandrel 72 counterclockwise as viewed in FIGS. 1 and 3 until the mandrel is rotated a predetermined angular distance to position lead wire 36 and grooves 120 at station 244 (FIG. 3). Microprocessor 236 then stops motors 54 and 98, thereby automatically providing a section of fresh material from station 244 to shear blade 28 of a length corresponding to a predetermined circumferential length necessary to form a cylindrical cage around the outer diameter of mandrel 72. The microprocessor then energizes motor 29 and blade 28 to shear mesh 24 at station 27. An optical sensor 245 signals the microprocessor when the shearing action is complete, the microprocessor then commanding motor 98 to rotate mandrel 72 counterclockwise a predetermined angular distance to bring lead wire 36 and grooves 120 around to a station 246 slightly past the weld station 248 of guns 76 (see FIGS. 3 and 13). As mandrel 72 is rotated counterclockwise, force rollers 206 bend mesh 24 around the mandrel to form the circular cage. The circumferential length of the sheared mesh segment is such that, when the lead wire 36 is at its final station 246, the trailing edges of wire ends 34b are still retained under rollers 206 to hold the cage in place for welding. As pointed out above, the center line of mandrel 72 is slightly cocked with respect to the path of travel of mesh 24 so that the mesh is wound in helical fashion on the mandrel and opposite ends 34a and 34b of wires 34 lie adjacent and side-by-side in the weld position (FIG. 13).

Next, microprocessor 236 commands motor 200 to lower plate 190 and torches 76 a predetermined distance to their weld position shown in FIG. 3. As plate 190 is lowered notches 224 of cam plates 222 clamp opposite ends 34a and 34b of wires 34 together (FIGS. 5 and 13) in a weld position.

Mircroprocessor 236 then initiates the weld sequence. As discussed above and shown in FIG. 14, there are three electrical power generators 232 operated from a standard, readily available 220/440 volt, 3 phase, 200 amp service. Eleven guns 76 are powered from each generator sequentially for one and one-half second intervals under control of contactors 234 and microprocessor 236. Consequently, three guns 76 will be welding simultaneously, each powered from its corresponding separate generator. For each group of eleven guns 76, the microprocessor rapidly sequences contactors 234 to sequentially power the guns for one and one-half second intervals. As already mentioned, immediately before each contactor 234 is operated to feed electric power to its associated gun 76, microprocessor 236 operates the gas valve associated with that gun to provide a short argon gas purge before the weld is instituted. The total time to complete the weld sequence and provide thirty-three welds 250 (FIG. 13) at station 248 is sixteen and one-half seconds (11 guns×1½ seconds/gun).

It should be appreciated that by operating the guns 76 of each group in sequence, rather than all simultaneously, the electric service requirements to generators 232 are substantially reduced, and a 200 amp service, readily available at most concrete pipe manufacturing plants is sufficient.

At the end of the weld sequence, microprocessor 236 commands motor 200 to drive plate 190, guns 76, and cam plates 222 upwardly to their raised positions, with cam plates 222 released from the welded cage on mandrel 72. An optical sensor 252 signals the microprocessor 236 of the raised position, the microprocessor then energizing motor 98 to rotate mandrel 72 counterclockwise a predetermined angular distance to thereby roll the trailing edges of ends 34b under rollers 206. Next motor 98 is stopped, and air cylinder 172 is deenergized to release clamps 108 from lead wire 36. The welded cage is then slid to the right in FIG. 2 off mandrel 72, which is then rotated under control of microprocessor 236 to its start position shown in FIG. 3, ready to form the next cage.

The method and apparatus described hereinabove advantageously produce wire cages at high production rates. For example, operating from a 200 amp service as described, forty cages per hour for fifteen inch concrete pipe can be produced. If a heavier 600 amp service is available, sixty cages per hour could be produced. In addition, the apparatus is operated by only one man to substantially reduce labor costs. Most importantly, the welds are consistent and of superior quality and the TIG guns can weld any wire even though the wire may be rusty.

Various sized cages can be produced for use with different sized pipe by interchanging mandrels 72 of different diameters. The vertical adjustability of plates 64 and 190 readily accommodates different sized mandrels.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for forming a cage from a section of wire mesh having a plurality of longitudinal and transverse wires comprising frame means, mandrel means mounted on said frame means, means associated with said mandrel means for wrapping said section around said mandrel means so that opposite ends of said longitudinal wires are positioned adjacent each other, welding means mounted on said frame means and including a plurality of welding units each associated with the opposite ends of one of said longitudinal wires, and control means for energizing said welding units to weld said opposite ends together.

2. The apparatus according to claim 1, wherein said control means energizes said welding units in sequence.

3. The apparatus according to claim 1, wherein said welding units are TIG welding units.

4. The apparatus according to claim 3, wherein said control means energizes welding units in sequence.

5. The apparatus according to claim 1, said associated means including drive means for rotating said mandrel means, clamp means for holding said mesh section on said mandrel means, and forming means for forcing said section to conform to said mandrel means as said mandrel means is rotated.

6. The apparatus according to claim 5, wherein said clamp means grasps the leading one of said transverse wires to that said mesh section moves with said mandrel means as said mandrel means is rotated, said forming means being mounted adjacent said mandrel means.

7. The apparatus according to claim 6, said forming means being roller means which applies a bending force against said mesh section.

8. The apparatus according to claim 5, said welding means including mounting means for adjustably supporting said welding units for movement toward and away from said mandrel means, and adjusting means for moving said welding units between an outer position and an inner weld position.

9. The apparatus according to claim 8, each of said welding units including positioner means for clamping said opposite ends of said longitudinal wires when said units are in their inner weld position.

10. The apparatus according to claim 8, wherein said welding units are TIG welding units.

11. The apparatus according to claim 10, wherein said control means energizes said welding units in sequence.

12. The apparatus according to claim 5, said mandrel means including a plurality of grooves extending longitudinally therealong and spaced circumferentially therearound a distance substantially equal to the spacing between the transverse wires of said mesh.

13. The apparatus according to claim 12, said grooves extending angularly with respect to the center line of said mandrel means.

14. The apparatus according to claim 12, said clamp means including clamp element means mounted adjacent one of said grooves for clamping the leading one of said transverse wires so that said mesh section moves with said mandrel means as said mandrel means rotates, and means for moving said clamp element means between release and clamp positions.

15. Apparatus for forming a cage from wire mesh having a plurality of longitudinal and transverse wires comprising support means for holding a coil of wire mesh, mandrel means around which a cage is formed, shear means between said support means and said mandrel means, feed means for feeding the wire mesh off the coil to said shear means and said mandrel means, said shear means being operable to cut a section of said wire mesh of predetermined length, means associated with said mandrel means for wrapping said section around said mandrel means so that opposite ends of said longitudinal wires are positioned adjacent each other, welding means mounted adjacent said mandrel means and including a plurality of welding units each associated with the opposite ends of one of the longitudinal wires, and control means for energizing said welding units to weld said opposite ends together.

16. The apparatus according to claim 15, wherein said control means energizes said welding units in sequence.

17. The apparatus according to claim 15, wherein said welding units are TIG welding units.

18. The apparatus according to claim 17, wherein said control means energizes said welding units in sequence.

19. The apparatus according to claim 15, said associated means including drive means for rotating said mandrel means, clamp means for holding said mesh section on said mandrel means, and forming means for forcing said section to conform to said mandrel mans as said mandrel means is rotated.

20. The apparatus according to claim 19, wherein said clamp means grasps the leading one of said transverse wires so that said mesh section moves with said mandrel means as said mandrel means is rotated, said forming means being mounted adjacent said mandrel means.

21. The apparatus according to claim 20, said forming means being roller means which applies a bending force against said mesh section.

22. The apparatus according to claim 20, wherein said control means energizes said feed means to feed said mesh past said shear means to said mandrel means, then activates said clamp means to grasp the leading one of said transverse wires, then energizes said mandrel drive means to rotate said mandrel means a predetermined angular distance to establish the predetermined length of said mesh section back to said shear means, then operates said shear means to cut said section, then again energizes said drive means to wrap said section around said mandrel means, then energizes said welding units to weld said opposite ends of said longitudinal wires.

23. The apparatus according to claim 22, wherein said control means energizes said welding units in sequence.

24. The apparatus according to claim 19, said welding means including mounting means for adjustably supporting said welding units for movement toward and away from said mandrel means, and adjusting means for moving said welding units between an outer position and an inner weld position.

25. The apparatus according to claim 24, each of said welding units including positioner means for clamping said opposite ends of said longitudinal wires when said units are in their inner weld position.

26. The apparatus according to claim 24, wherein said welding units are TIG welding units.

27. The apparatus according to claim 26, wherein said control means energizes said welding units in sequence.

28. The apparatus according to claim 19, said mandrel means including a plurality of grooves extending longitudinally therealong and spaced circumferentially therearound a distance substantially equal to the spacing between the transverse wires of said mesh.

29. The apparatus according to claim 28, said grooves extending angularly with respect to the center line of said mandrel means.

30. The apparatus according to claim 28, said clamp means including clamp element means mounted adjacent one of said grooves for clamping the leading one of said transverse wires so that said mesh section moves with said mandrel means as said mandrel means is rotated, and means for moving said clamp element means between release and clamp positions.

31. A method of forming and welding a cage from a section of wire mesh having a plurality of longitudinal and transverse wires comprising wrapping said section around a mandrel, clamping said section on said mandrel so that opposite ends of each of said longitudinal wires lie adjacent each other, providing a plurality of welding units each located adjacent the opposite ends of one of the longitudinal wires, and sequentially energizing the welding units to weld the longitudinal wires in sequence.

32. The method according to claim 31, wherein the welding units employ the TIG welding process.

33. The method according to claim 31, comprising supporting a coil of said wire mesh, feeding said wire mesh from said coil past a shear to said mandrel, clamping the lead one of said transverse wires on said mandrel, rotating said mandrel a predetermined angular distance to establish said section of predetermined length between said lead transverse wire and said shear, actuating said shear to cut said mesh, rotating said mandrel to wrap said section therearound and position said opposite ends of said longitudinal wires adjacent each other prior to said welding step.

34. The method according to claim 33, wherein said welding units employ the TIG welding process.

35. The method of claim 33, wherein the various steps are automatically performed in sequence under the control of an automatic control system.

* * * * *